US011801729B2

(12) United States Patent
Kim et al.

(10) Patent No.: US 11,801,729 B2
(45) Date of Patent: Oct. 31, 2023

(54) AIR CONDITIONING APPARATUS FOR VEHICLE

(71) Applicant: Hanon Systems, Daejeon (KR)

(72) Inventors: Yong Ho Kim, Daejeon (KR); Hak Kyu Kim, Daejeon (KR); Seung Kyu Oh, Daejeon (KR); Jae Won Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/761,390

(22) PCT Filed: Nov. 4, 2020

(86) PCT No.: PCT/KR2020/015260
§ 371 (c)(1),
(2) Date: Mar. 17, 2022

(87) PCT Pub. No.: WO2021/091204
PCT Pub. Date: May 14, 2021

(65) Prior Publication Data
US 2022/0371398 A1     Nov. 24, 2022

(30) Foreign Application Priority Data

Nov. 8, 2019 (KR) .................. 10-2019-0142198
Oct. 13, 2020 (KR) .................. 10-2020-0131905

(51) Int. Cl.
*B60H 1/00* (2006.01)
*B60H 1/24* (2006.01)

(52) U.S. Cl.
CPC ..... *B60H 1/00507* (2013.01); *B60H 1/00664* (2013.01); *B60H 1/242* (2013.01); *B60H 1/246* (2013.01)

(58) Field of Classification Search
CPC .......... B60H 1/00507; B60H 1/00664; B60H 1/242; B60H 1/246; B60H 1/00514;
(Continued)

(56) References Cited

U.S. PATENT DOCUMENTS 10,800,226 B2   10/2020   Shimoyama et al.
2018/0117987 A1   5/2018   Yamaoka et al.

FOREIGN PATENT DOCUMENTS

DE   102004048951 A1   6/2005
EP   3144166 A1   3/2017
(Continued)

OTHER PUBLICATIONS

Written Opinion of the International Searching Authority and International Search Report for International Application No. PCT/KR2020/015260, dated Feb. 18, 2021, 9 page(s), English Translation of International Search Report Included.

*Primary Examiner* — Emmanuel E Duke
(74) *Attorney, Agent, or Firm* — Dickinson Wright PLLC

(57) ABSTRACT

Disclosed is an air conditioning apparatus for a vehicle, the air conditioning apparatus being applicable to an autonomous vehicle, etc. having console removed therefrom by ensuring a lower space of a driver's seat in a front part of the vehicle and being capable of preventing condensate water from flowing backward. The air conditioning apparatus for a vehicle comprises: an air conditioning case having an air flow path formed therein and a plurality of air discharge ports; and a cooling heat exchanger and a heating heat exchanger provided in the air flow path of the air conditioning case and exchanging heat with the air passing through the air flow path, wherein the air discharge ports include a front seat air discharge port and a back seat air discharge port, and the back seat air discharge port is arranged under the heating heat exchanger in the direction of gravity.

16 Claims, 14 Drawing Sheets

(58) Field of Classification Search
CPC ...... B60H 1/00064; B60H 2001/00078; B60H 2001/002
See application file for complete search history.

(56) References Cited

FOREIGN PATENT DOCUMENTS

| | | | |
|---|---|---|---|
| JP | 2005219574 A | * | 8/2005 |
| JP | 2010202156 A | | 9/2010 |
| JP | 6508411 B2 | | 5/2019 |
| KR | 20110090478 A | * | 8/2011 |
| KR | 1484718 B1 | | 1/2015 |
| KR | 1020170086724 A | | 7/2017 |
| KR | 1020190044893 A | | 5/2019 |

\* cited by examiner

PRIOR ART

AIR CONDITIONING APPARATUS FOR VEHICLE

CROSS-REFERENCE TO RELATED APPLICATIONS

This application is a U.S. National Stage of International Patent Application Serial No. PCT/KR2020/015260, filed Nov. 4, 2020, which claims the benefit of Korean Patent Application Serial No. 10-2019-0142198, filed Nov. 8, 2019, and Korean Patent Application Serial No. 10-2020-0131905, filed Oct. 13, 2020. The entire disclosures of each of the above applications are incorporated herein by reference.

TECHNICAL FIELD

The present invention relates to an air conditioner for a vehicle, and more particularly, to an air conditioner for a vehicle, which has a rear seat outlet for performing air conditioning of a rear seat of a vehicle and has an optimized arrangement of components for the rear seat air conditioning.

BACKGROUND ART

In general, the vehicle air conditioner is a vehicle interior that is installed for the purpose of securing the driver's front and rear view by removing the frost from the windshield or heating in the summer or winter, or during the rain or winter season. As such, the air conditioner is usually equipped with a heating device and a cooling device at the same time to selectively introduce the outside air or bet, and then heats or cools the air and blows it into the vehicle interior, thereby cooling, heating, or ventilating the interior of the vehicle.

Korean Patent No. 1484718 (granted on Jan. 14, 2015) discloses an air conditioner for a vehicle which adjusts the air volume of a rear seat by controlling locations of a rear seat temperature door, an auxiliary rear seat temperature door, and a rear seat on-off door. FIG. 1 is a sectional view illustrating a conventional air conditioner for a vehicle. As illustrated in FIG. 1, the conventional air conditioner for a vehicle includes an air conditioning case 10, an evaporator 20, a heater core 30, a front seat temperature door 51, and a front seat mode door.

The air conditioning case 10 includes an air inlet 11, air outlets, and an air passage formed therein. An air blower is connected to the air inlet 11, so that indoor air or outdoor air is selectively induced into the air passage of the air conditioning case 10. The air outlets are a defrost vent 12, a front seat face vent 13, a floor vent 114, a rear seat face vent 15, and a rear seat floor vent 16. The air passage in the air conditioning case 10 includes a front seat cold air passage P1, a hot air passage P2, and a rear seat cold air passage P3.

The evaporator 20 is a cooling heat exchanger to cool air passing through the evaporator 20. The heater core 30 is a heating heat exchanger to heat air passing through the evaporator 20. The heater core 30 is arranged at the hot air passage P2 which is located at a downstream side of the evaporator 20 in an air flow direction. An electric heater 40, such as a PTC heater, may be disposed in the hot air passage P2. The front seat temperature door 51 is arranged between the evaporator 20 and the heater core 30 in order to adjust an opening degree of the hot air passage P2 passing through the heater core 30 and opening degrees of the cold air passages P1 and P3 bypassing the heater core 30. The front seat mode door is composed of a defrost door 53, a vent door 54, and a floor door 55.

A rear seat air passage is composed of the rear seat cold air passage P3 that the air passing the evaporator 20 bypasses the heater core 30, and the hot air passage that the air passes the heater core 30. The hot air passage of the rear seat air passage is the hot air passage P2 of a front seat air passage. That is, some of the air flowing in the hot air passage P2 after passing the heater core 30 moves up, and then, is discharged to at least one among the defrost vent 12, the front seat face vent 13, and the floor vent 114. The rest of the air moves down, and then, is discharged to at least one among the console vent 15 and the rear seat floor vent 16. A rear seat mode door 58 which adjusts an opening degree of the console vent 15 and an opening degree of the rear seat floor vent 16 is disposed in the rear seat air passage.

In the air conditioning case 10, a rear seat temperature door 52, an auxiliary rear seat temperature door 56, and a rear seat on-off door 57 are disposed. The rear seat temperature door 52 is disposed between the evaporator 20 and the heater core 30 in order to adjust an opening degree of a passage connected to the hot air passage P2 and a passage connected to the rear seat cold air passage P3, and the auxiliary rear seat temperature door 56 is arranged at the downstream side of the heater core 30 in the air flow direction in order to adjust an opening degree of a passage connected to a rear seat air outlet. The rear seat on-off door 57 adjusts an opening degree of the rear seat cold air passage P3.

In the front seat and rear seat cooling mode, the front seat temperature door 51 closes the hot air passage P2 and opens the front seat cold air passage P1, and the rear seat temperature door 52 closes the hot air passage P2 and opens the rear seat cold air passage P3. The auxiliary rear seat temperature door 56 closes the passage connected to the rear seat air outlet, and the rear seat on-off door 57 opens the rear seat cold air passage P3. The air cooled while passing the evaporator 20 bypasses the heater core 30, and then, some of the air is discharged to at least one among front seat air outlets, and the rest of the air is discharged to at least one among rear seat air outlets after passing through the rear seat cold air passage P3.

In the front seat and rear seat heating mode, the front seat temperature door 51 closes the front seat cold air passage P1 and opens the hot air passage P2, and the rear seat temperature door 52 closes the rear seat cold air passage P3 and opens the hot air passage P2. The auxiliary rear seat temperature door 56 opens the passage connected to the rear seat air outlet, and the rear seat on-off door 57 closes the rear seat cold air passage P3. The air passing the evaporator 20 is heated while passing the heater core 30, and then, some of the air moves up and is discharged to at least one among the front seat air outlets, and the rest of the air moves down and is discharged to at least one among the rear seat air outlets.

The conventional air conditioner for a vehicle requires a predetermined width or more in a back-and-forth direction of the vehicle. In the case of autonomous vehicles which have been developed recently, it is designed to minimize a volume of a dashboard in order to secure an interior space of the vehicle. Finally, there have been various attempts to reduce the width of the air conditioner in the back-and-forth direction of the vehicle.

Especially, some of autonomous vehicles which have been developed actively have a concept of removing the console located between a front seat and a rear seat. Such vehicles need to secure a space below the front seat.

DISCLOSURE

Technical Problem

Accordingly, the present invention has been made in an effort to solve the above-mentioned problems occurring in the prior arts, and it is an object of the present invention to provide an air conditioner for a vehicle which can sufficiently secure an interior space in a dashboard and efficiently embody various rear seat air conditioning modes and rear seat temperature controls by reducing a volume of an air conditioning case in an anterior direction.

It is another object of the present invention to provide an air conditioner for a vehicle which is applicable to an autonomous vehicle, from which a console is removed, by securing a lower space of a driver's seat and can prevent a counterflow of condensate water.

Technical Solution

To achieve the above objects, the present invention provides an air conditioner for a vehicle, which includes an air conditioning case having an air passage formed therein and a plurality of air outlets, and a cooling heat exchanger and a heating heat exchanger which are disposed in the air passage of the air conditioning case to exchange heat with air passing through the air passage, wherein the air outlets comprise a front seat air outlet and a rear seat air outlet, and the rear seat air outlet is arranged below the heating heat exchanger in the direction of gravity.

The rear seat air outlet is arranged at a place extending downward from the air conditioning case.

The air passage of the air conditioning case includes a hot air passage formed such that the air passing through the cooling heat exchanger passes through the heating heat exchanger, a front seat cold air passage formed such that the air passing through the cooling heat exchanger bypasses the heating heat exchanger to be discharged to the front seat of the vehicle, and a rear seat cold air passage formed such that the air passing through the cooling heat exchanger bypasses the heating heat exchanger to be discharged to the rear seat of the vehicle. The front seat cold air passage, the hot air passage, and the rear seat cold air passage are formed sequentially from top to bottom.

The air conditioner for a vehicle includes: a front seat temperature door which adjusts the degree of opening between the front seat cold air passage and the hot air passage; a first rear seat temperature door which is arranged between the cooling heat exchanger and the heating heat exchanger to adjust the degree of opening between the rear seat cold air passage and the hot air passage; a second rear seat temperature door which is arranged downstream of the heating heat exchanger to adjust the degree of opening between the rear seat cold air passage and the hot air passage; and a rear seat on-off door which adjusts the degree of opening of the rear seat cold air passage.

A front seat mixing part and a rear seat mixing part are arranged vertically side by side in the direction of gravity.

The rear seat air outlet is parallel with the heating heat exchanger and is located inside a parallel extension line getting in contact with the air conditioning case.

The rear seat air outlet, the second rear seat temperature door, and the rear seat on-off door are arranged within a width of the heating heat exchanger in the back-and-forth direction of the vehicle.

The rear seat air outlet, the second rear seat temperature door, and the rear seat on-off door are all arranged on the outer face of the vehicle based on a dashboard.

The rear seat on-off door is arranged downstream of the rear seat mixing part.

The heating heat exchanger is arranged to be inclined.

A counterflow prevention rib is formed in the air conditioning case to prevent water containing condensate water from being discharged to the rear seat air outlet.

The counterflow prevention rib protrudes upward from the floor surface of the air conditioning case, and is formed between the cooling heat exchanger and the rear seat mixing part.

The second rear seat temperature door and the rear seat on-off door are arranged below the heating heat exchanger in the direction of gravity, and the second rear seat temperature door, the rear seat on-off door, and the rear seat air outlet are arranged sequentially in a straight line in the direction of gravity.

The rear seat mixing part where the air passing through the hot air passage and the air passing through the rear seat cold air passage are joined together is formed below the heating heat exchanger, and the rear seat air outlet is formed below the rear seat mixing part.

A rear seat air discharge duct is disposed below the rear seat air outlet, and the rear seat air discharge duct extends downward to be formed on the floor of the vehicle.

In another aspect of the present invention, the present invention provides an air conditioner for a vehicle, which includes an air conditioning case having an air passage formed therein and a plurality of air outlets, and a cooling heat exchanger and a heating heat exchanger which are disposed in the air passage of the air conditioning case to exchange heat with air passing through the air passage. The air outlets include a front seat air outlet and a rear seat air outlet, and the rear seat air outlet is arranged below the front seat air outlet in the direction of gravity.

Advantageous Effects

The air conditioner for a vehicle according to an embodiment of the present invention can sufficiently secure an interior space in a dashboard and efficiently embody various rear seat air conditioning modes and rear seat temperature controls by reducing the volume of the air conditioning case in the anterior direction. Therefore, the air conditioner for a vehicle according to an embodiment of the present invention is effectively applicable to new vehicles, such as autonomous vehicles.

Additionally, the air conditioner for a vehicle according to an embodiment of the present invention is applicable to a vehicle, from which a console is removed, by optimizing the position of the rear seat outlet, and can effectively solve the problem of condensate water counterflow which may occur due to the position optimization of the rear seat outlet.

MODE FOR INVENTION

Hereinafter, a technical structure of an air conditioner for a vehicle according to a preferred embodiment of the present invention will now be described in detail with reference to the attached drawings.

Figure 1:
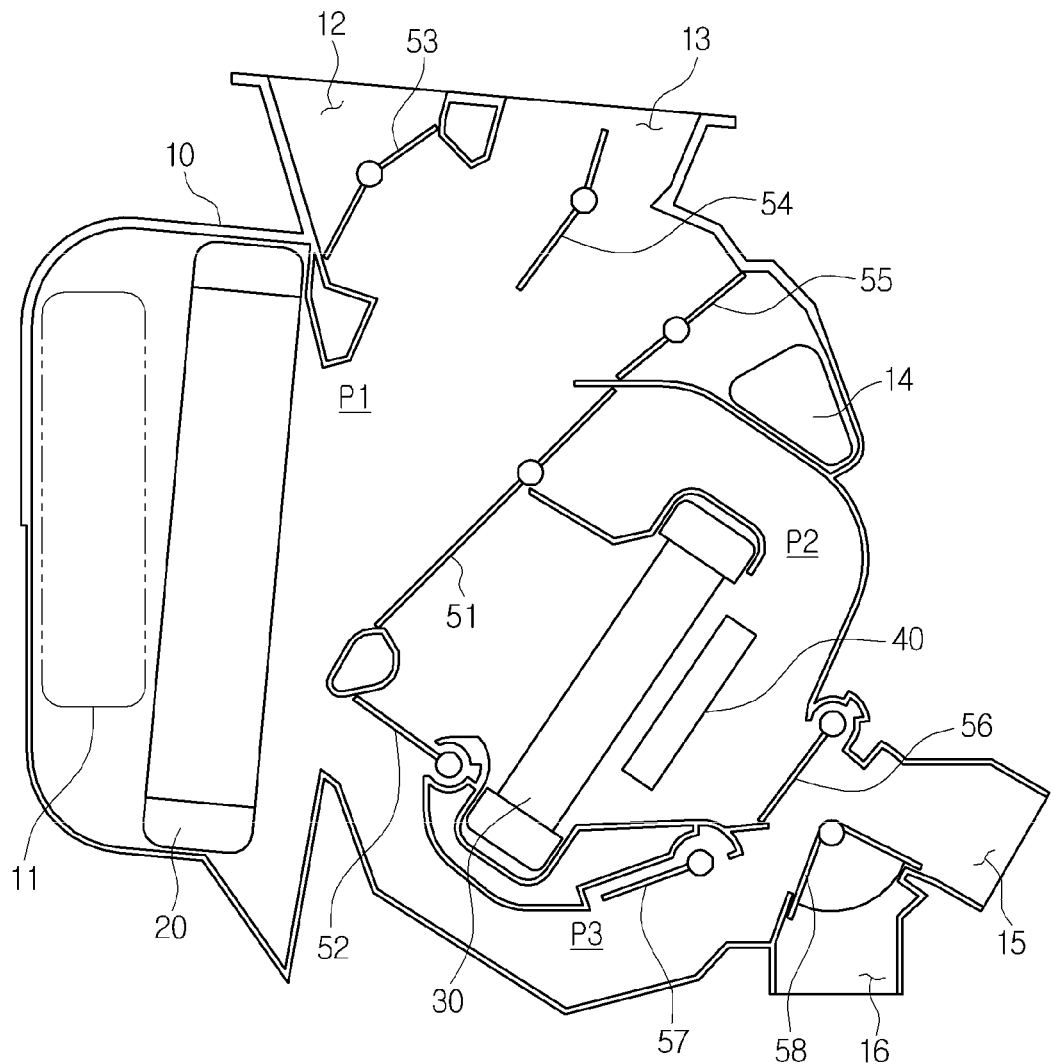
FIG. 1 is a sectional view illustrating a conventional air conditioner for a vehicle.
Figure 2:
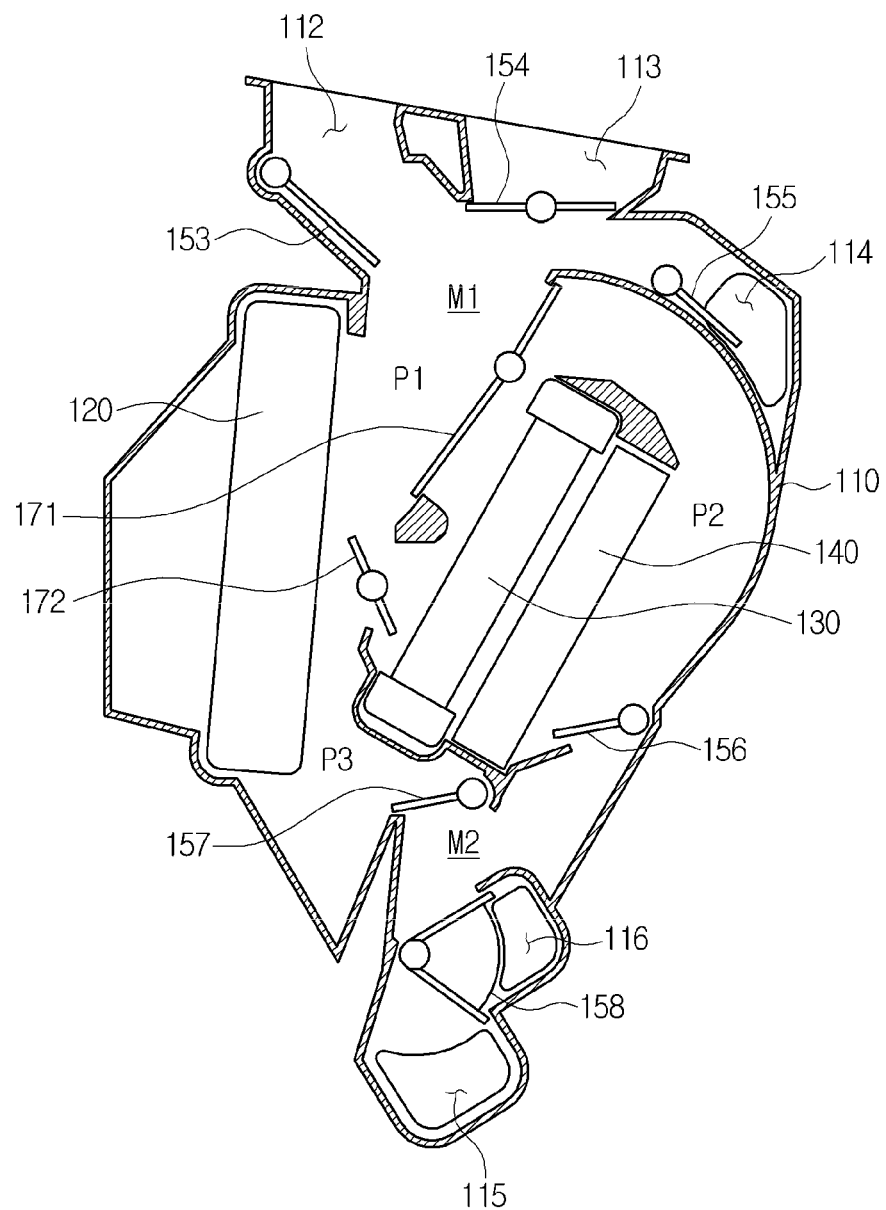
FIG. 2 is a sectional view illustrating an air conditioner for a vehicle according to a first preferred embodiment of the present invention.
Figure 3:
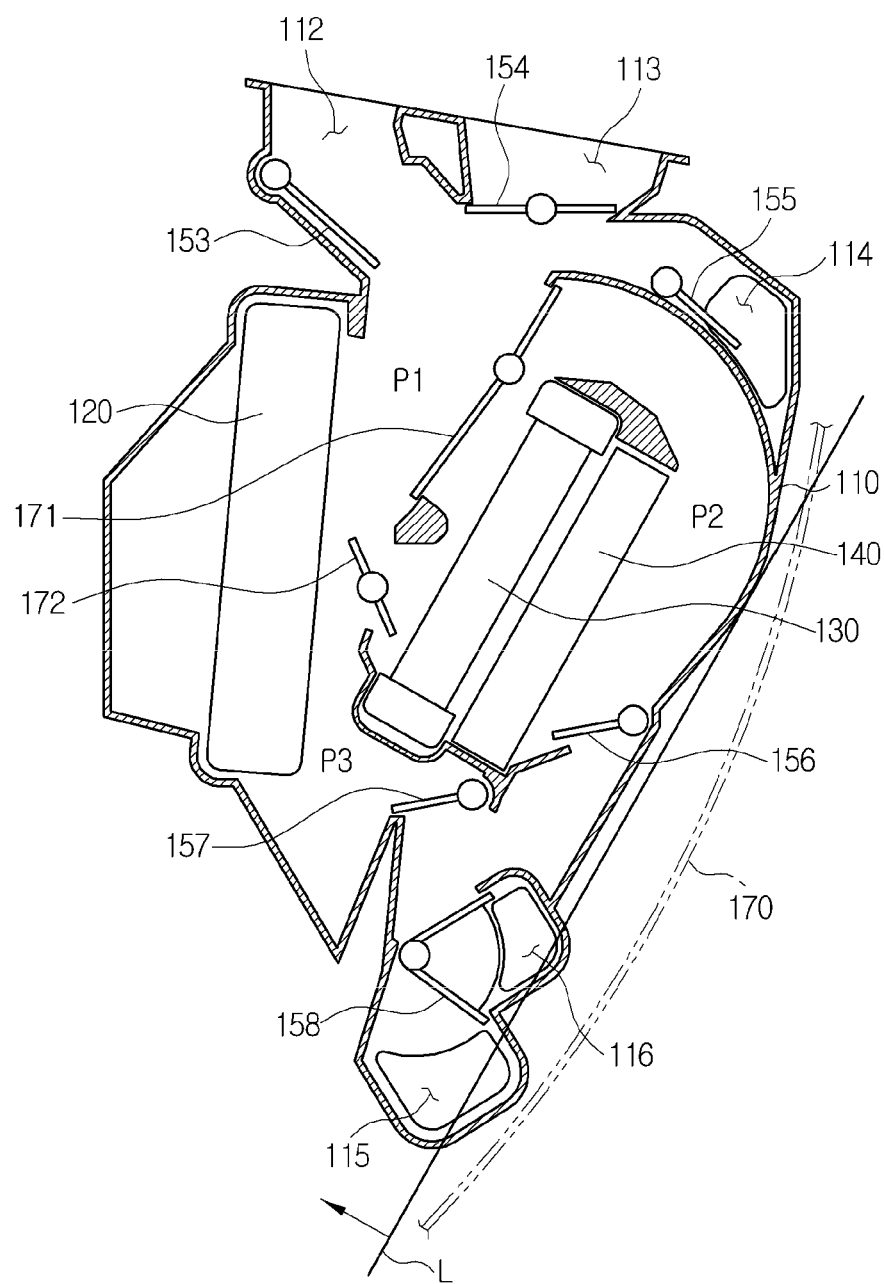
FIG. 3 is a view illustrating a state in which the air conditioner for a vehicle according to the first preferred embodiment of the present invention is installed in a dashboard.
Figure 4:
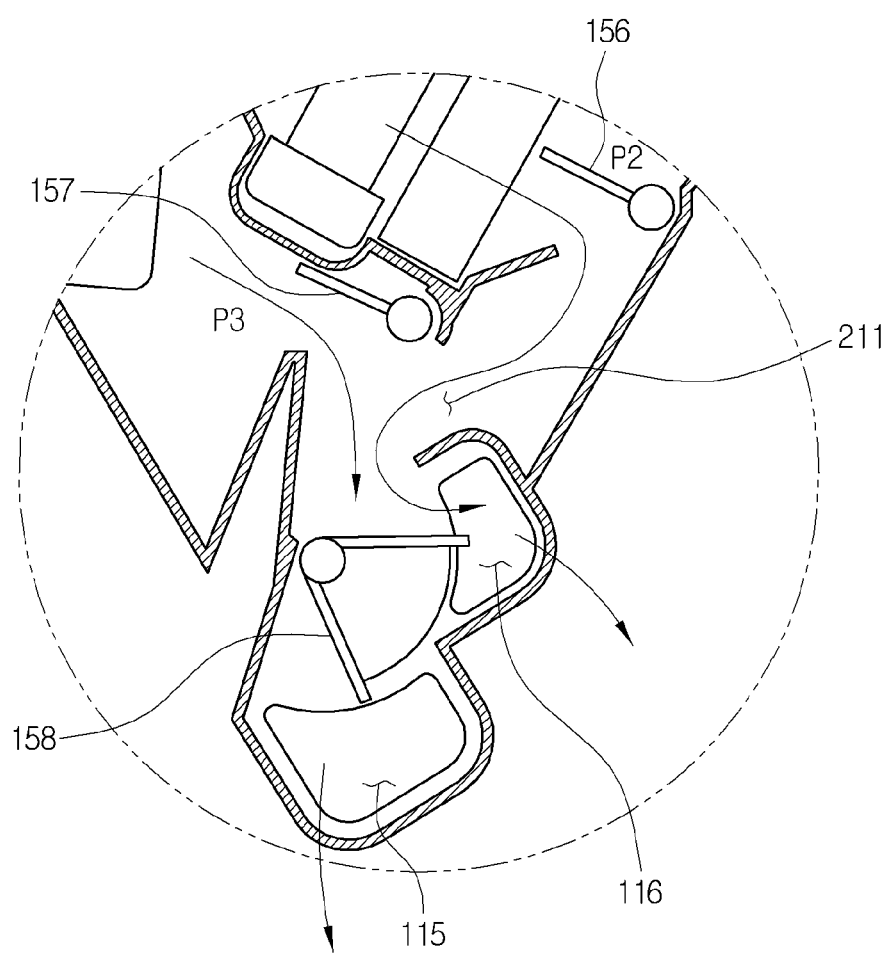
FIG. 4 is a partially enlarged sectional view of FIG. 2.

Referring to FIGS. 2 to 4, the air conditioner for a vehicle according to a first preferred embodiment of the present invention includes an air conditioning case 110 having an air passage formed therein, and a cooling heat exchanger and a heating heat exchanger which are disposed in the air passage of the air conditioning case 110 to exchange heat with air passing through the air passage.

The air conditioning case 110 includes a plurality of air outlets and an air inlet. An air blower is connected to the air inlet so that indoor air or outdoor air is selectively induced into the air passage. The air outlets include a front seat air outlet composed of a defrost vent 112, a front seat face vent 113, and a front seat floor vent 114, and a rear seat air outlet composed of a rear seat face vent 115 and a rear seat floor vent 116. The rear seat face vent 115 may be a console or a B-pillar outlet.

The cooling heat exchanger is an evaporator 120. Refrigerant flowing in the evaporator 120 and air passing through the evaporator 120 exchange heat with each other so that the air is cooled. The heating heat exchanger is a heater core 130. Cooling water flowing in the heater core 130 and air passing through the heater core 130 exchange heat with each other so that the air is heated. The heater core 130 is arranged in a hot air passage P2 which is located at the downstream side of the evaporator 120 in an air flow direction. An electric heater 140, such as a PTC heater, may be further disposed in the hot air passage P2.

The air passage formed in the air conditioning case 110 includes a front seat cold air passage P1, the hot air passage P2, and a rear seat cold air passage P3. That is, the air passage at the downstream side of the evaporator 120 is composed of the front seat cold air passage P1, the hot air passage P2, and the rear seat cold air passage P3. The front seat cold air passage P1, the hot air passage P2, and the rear seat cold air passage P3 are arranged in sequence from top to bottom, and the hot air passage P2 is arranged between the front seat cold air passage P1 and the rear seat cold air passage P3 in a vertical direction.

The hot air passage P2 is configured such that the air passing through the evaporator 120 passes the heat core 130 and the electric heater 140 and flows toward the front seat or the rear seat of the vehicle. The front seat cold air passage P1 is configured such that the air passing through the evaporator 120 bypasses the heat core 130 and the electric heater 140 and is discharged to the front seat of the vehicle. The rear seat cold air passage P3 is configured such that the air passing through the evaporator 120 bypasses the heat core 130 and the electric heater 140 and is discharged to the rear seat of the vehicle. The air passing through the evaporator 120 bypasses the heater core 130 of the hot air passage P2 and flows to the front seat cold air passage P1 and the rear seat cold air passage P3, or passes through the heater core 130 of the hot air passage P2 and joins and flows in the front seat cold air passage P1 or the rear seat cold air passage P3.

The air conditioning case 110 includes the front seat air outlet for discharging air toward the front seat of the vehicle, and an opening degree of the front seat air outlet is controlled by a front seat mode door. The front seat mode door is composed of a defrost door 153 adjusting an opening degree of the defrost vent 112, a vent door 154 adjusting an opening degree of the front seat face vent 113, and a floor door 155 adjusting an opening degree of the front seat floor vent 114. Additionally, the air conditioning case 110 further includes the rear seat air outlet for discharging air toward the rear seat of the vehicle, and an opening degree of the rear seat air outlet is controlled by a rear seat mode door 158.

The air conditioner for a vehicle includes a front seat temperature door 171. The front seat temperature door 171 adjusts an opening degree between the front seat cold air passage P1 and some of the hot air passage P2. The front seat temperature door 171 is adjacent to the downstream side of the evaporator 120 and is located at a boundary area which where the front seat cold air passage P1 and the hot air passage P2 are divided. The front seat temperature door 171 is formed in a tail door type which has plate members formed at both sides in the radial direction based on a rotary shaft.

The air conditioner for a vehicle according to the preferred embodiment of the present invention is configured to perform the temperature control of independent three zones including a driver's seat of the front side, a passenger's seat of the front side, and a rear seat, and has three doors for controlling temperature of the rear seat. That is, the air conditioner includes a first rear seat temperature door 172, a second rear seat temperature door 156, and a rear seat mode door 158.

The first rear seat temperature door 172 is arranged between the evaporator 120 and the heater core 130 in order to adjust an opening degree of the other part of the hot air passage P2. That is, the first rear seat temperature door 172 adjusts the opening degree of some part of the entrance of the hot air passage P2 which is not covered by the front seat temperature door 171.

The second rear seat temperature door 200 is arranged at the downstream side of the heater core 130 and the electric heater 140 in order to adjust an opening degree between the hot air passage P2 and the rear seat cold air passage P3. The second rear seat temperature door 156 is a dome-like door having a dome 240. The hot air passage P2 and the rear seat cold air passage P3 which are located at the downstream side of the heater core 130 are configured to communicate with each other. The second rear seat temperature door 156 is arranged in a communication passage between hot air passage P2 and the rear seat cold air passage P3 located at the downstream side of the heater core 130. That is, the second rear seat temperature door 156 adjusts an opening degree of the rear seat cold air passage P3 and an opening degree of the communication passage between hot air passage P2 and the rear seat cold air passage P3.

The rear seat mode door 158 is arranged at the downstream side of the second rear seat temperature door 156 in order to adjust an opening degree of the rear seat air outlet. The rear seat mode door 158 is a flat-type door. The rear seat mode door 158 adjusts opening degrees between the console vent 115 and the rear seat floor vent 116. Furthermore, the rear seat cold air passage P3 further includes a rear seat on-off door 157 which adjusts the degree of opening of the rear seat cold air passage P3.

The rear seat air outlet is arranged below the heating heat exchanger in the direction of gravity. Additionally, the rear seat mode door 158 is arranged below the heating heat exchanger in the direction of the gravity. That is, the rear seat air outlet and the rear seat mode door 158 are respectively arranged below the heater core 130 and the electric heater 140 in the direction of gravity. In addition, the second rear seat temperature door 156 and the rear seat on-off door 157 are arranged below the heating heat exchanger in the direction of gravity.

Through the configuration, the air conditioner according to the present invention can be installed in a dashboard 170 so as to increase the interior space at the front of the vehicle. Finally, the air conditioner according to the present invention is applicable to vehicles, such as autonomous vehicles newly developed.

Moreover, a joining part 211 between the downstream side of the hot air passage P2 and the rear seat cold air passage P3 is formed below the heater core 130 and the electric heater 140. In this instance, the rear seat air outlet extends downwards from the joining part 211 between the downstream side of the hot air passage P2 and the rear seat cold air passage P3.

Furthermore, the rear seat air outlet, the second rear seat temperature door 156, the rear seat on-off door 157, and the rear seat mode door 158 are all arranged on the outer face of the vehicle based on the dashboard 170. Additionally, the rear seat air outlet, the second rear seat temperature door 156, the rear seat on-off door 157, and the rear seat mode door 158 are arranged within the width of the heating heat exchanger (the heater core and the electric heater) in the back-and-forth direction of the vehicle.

The first rear seat temperature door 172 is arranged at the front end (upstream) of the heating heat exchanger (the heater core and the electric heater) to control an air inflow amount of the heating heat exchanger. The second rear seat temperature door 156 is arranged at the rear end (downstream) of the heating heat exchanger to control an amount of hot air transferred to the rear seat air outlet after passing through the heating heat exchanger.

The rear seat on-off door 157 is arranged at the lower end of the heating heat exchanger to control an amount of cold air bypassing the heating heat exchanger. In addition, the rear seat mode door 158 is arranged at the lower end of the rear seat on-off door 157 to control the degree of opening of the rear seat face vent 115 and the rear seat floor vent 116.

The air conditioner for a vehicle according to the present invention can reduce the width of the air conditioner in the back-and-forth direction of the vehicle, effectively embody various rear seat air conditioning modes and temperature controls, and maintain air conditioning performance without reduction of the air volume.

Additionally, a front seat mixing part M1 and a rear seat mixing part M2 are arranged vertically side by side in the direction of gravity. The front seat mixing part M1 is a space where the air passing through the front seat cold air passage and the air passing through the hot air passage are joined and mixed. In this instance, the rear seat mixing part M2 is the same as the joining part 211. In addition, the rear seat on-off door 157 is arranged at the downstream side of the rear seat mixing part M2. Through the above configuration, the width of the air conditioning case in the back-and-forth direction of the vehicle can be minimized through optimization in arrangement of passages.

Figure 5:
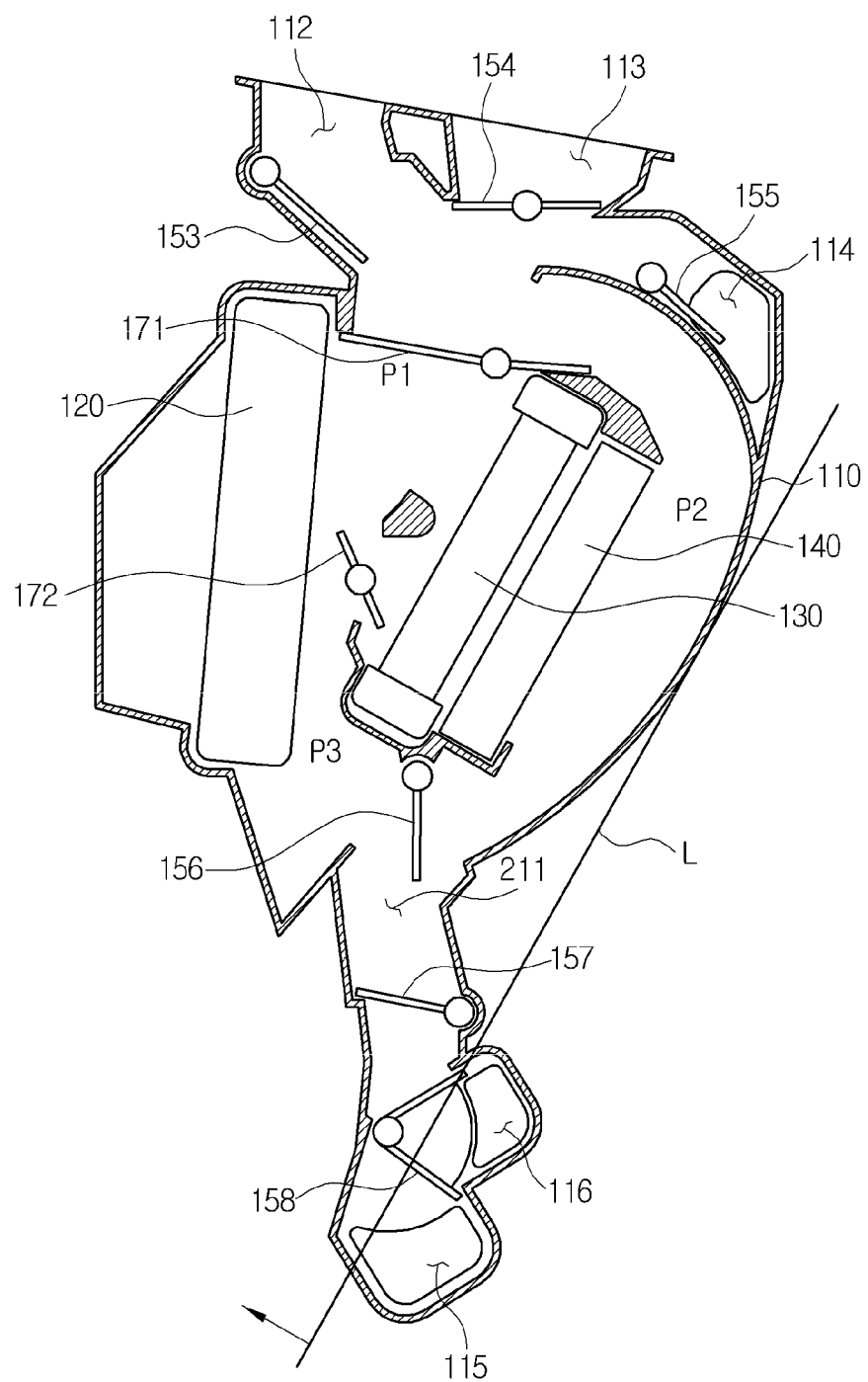
FIG. 5 is a sectional view illustrating an air conditioner for a vehicle according to a second preferred embodiment of the present invention.
Figure 6:
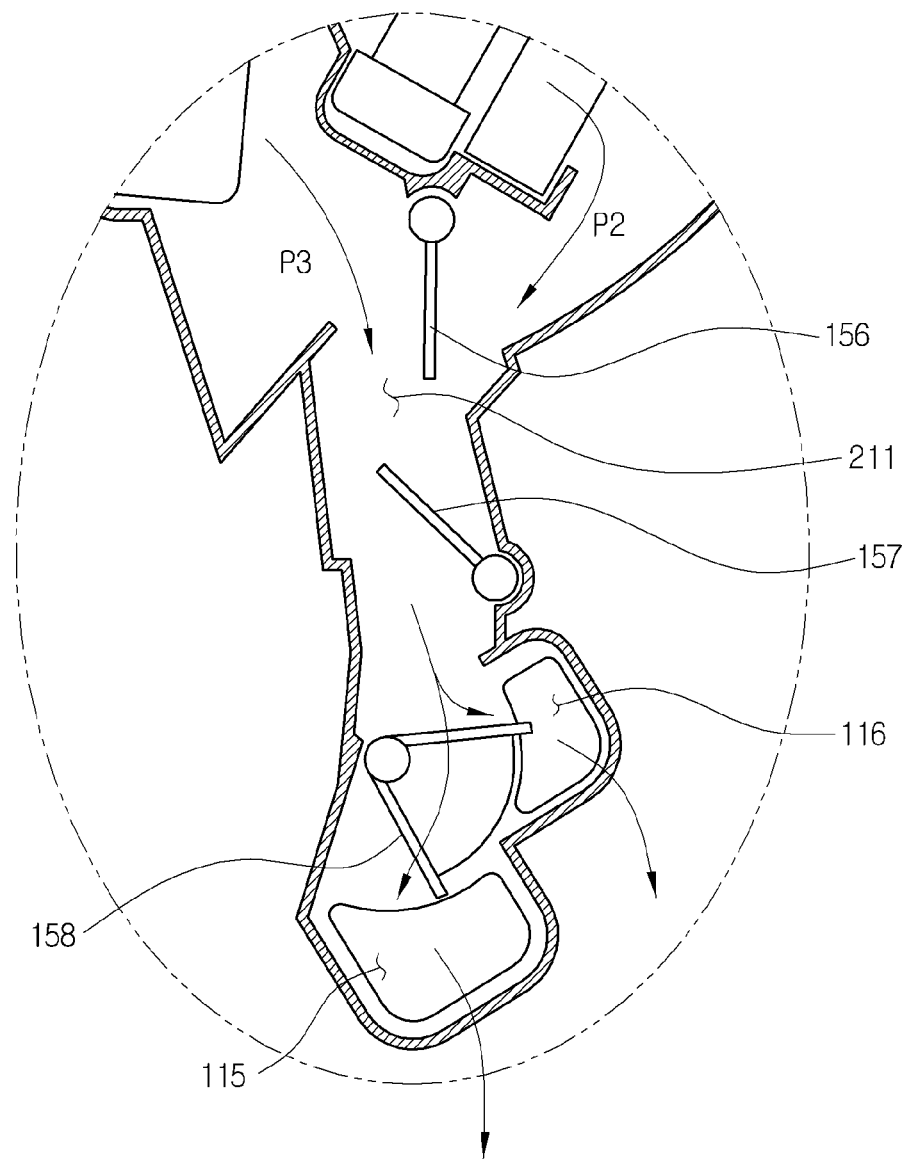
FIG. 6 is a partially enlarged sectional view of FIG. 5.

Meanwhile, referring to FIGS. 5 and 6, an air conditioner for a vehicle according to a second preferred embodiment of the present invention includes an air conditioning case 110 having an air passage formed therein, and a cooling heat exchanger and a heating heat exchanger which are disposed in the air passage of the air conditioning case 110 to exchange heat with air passing through the air passage.

The air conditioner for a vehicle according to the second preferred embodiment of the present invention is configured to perform the temperature control of independent three zones including a driver's seat of the front side, a passenger's seat of the front side, and a rear seat, and has three doors for controlling temperature of the rear seat. That is, the air conditioner includes a first rear seat temperature door 172, a second rear seat temperature door 156, and a rear seat mode door 158.

The rear seat air outlet is arranged below the heating heat exchanger in the direction of gravity. Additionally, the rear seat mode door 158 is arranged below the heating heat exchanger in the direction of the gravity. That is, the rear seat air outlet and the rear seat mode door 158 are respectively arranged below the heater core 130 and the electric heater 140 in the direction of gravity. In addition, the second rear seat temperature door 156 and the rear seat on-off door 157 are arranged below the heating heat exchanger in the direction of gravity.

Moreover, a joining part 211 between the downstream side of the hot air passage P2 and the rear seat cold air passage P3 is formed below the heater core 130 and the electric heater 140. In this instance, the rear seat air outlet extends downwards from the joining part 211 between the downstream side of the hot air passage P2 and the rear seat cold air passage P3.

In this instance, the hot air passage P2 is divided into an upper part and a lower part at the downstream side of the heater core 130 and the electric heater 140. That is, the heater core 130 and the electric heater 140 are mounted approximately at right angles, the air passing the heater core 130 and the electric heater 140 flows substantially horizontally, and some of the air flows upward and the remaining air flows downward at the downstream side of the heater core 130 and the electric heater 140.

That is, the hot air passage at the downstream side of the heater core 130 and the electric heater 140 is formed to be relatively shorter in the back-and-forth direction of the vehicle. The air passage heading the front seat air outlet is formed upward and the air passage heading the rear seat air outlet is formed downward so as to minimize the width of the air passage in the back-and-forth direction of the vehicle.

Furthermore, the rear seat air outlet, the second rear seat temperature door 156, the rear seat on-off door 157, and the rear seat mode door 158 are all arranged on the outer face of the vehicle based on the dashboard 170. Additionally, the rear seat air outlet, the second rear seat temperature door 156, the rear seat on-off door 157, and the rear seat mode door 158 are arranged within the width of the heating heat exchanger (the heater core and the electric heater) in the back-and-forth direction of the vehicle.

The first rear seat temperature door 172 is arranged at the front end (upstream) of the heating heat exchanger (the heater core and the electric heater) to control an air inflow amount of the heating heat exchanger. The second rear seat temperature door 156 is arranged at the rear end (downstream) of the heating heat exchanger to control a mixed amount between the hot air passing the heating heat exchanger and the cold air bypassing the heating heat exchanger.

The rear seat on-off door 157 is arranged at the lower end of the second rear seat temperature door 156 to control an amount of air heading the rear seat air outlet. Moreover, the rear seat mode door 158 is arranged at the lower end of the rear seat on-off door 157 to adjust the degree of opening of the rear seat face vent 115 and the rear seat floor vent 116.

As described above, the second rear seat temperature door 156, the rear seat on-off door 157, and the rear seat mode door 158 are arranged sequentially from top to bottom in a straight line in the direction of gravity. In detail, the second rear seat temperature door 156 is disposed at the joining part 211 between the downstream side of the hot air passage P2 and the rear seat cold air passage P3. The second rear seat temperature door 156 adjusts the degree of opening between the hot air passage P2 and the rear seat cold air passage P3.

In more detail, the joining passage in which the downstream side of the hot air passage P2 and the rear seat cold air passage P3 are joined is formed in an approximately "Y" shape. That is, the joining part 211 between the downstream side of the hot air passage P2 and the rear seat cold air passage P3 is formed at the central portion of the "Y" shape. The passage located at the left side upward from the joining part 211 is the rear seat cold air passage P3, and the passage located downward from the joining part 211 is the passage heading the rear seat air outlet.

Through the above configuration, the air conditioner for a vehicle according to the present invention can further reduce the width thereof in the back-and-forth direction of the vehicle, and secure the interior space of the vehicle since the dashboard can be mounted at the front of the vehicle due to the reduced width. That is, compared with the former embodiment, the air conditioner for a vehicle according to the second preferred embodiment can further reduce the width thereof in the back-and-forth direction of the vehicle since the second rear seat temperature door 156 is arranged not at the rear end but at the lower end of the heating heat exchanger.

Figure 7:
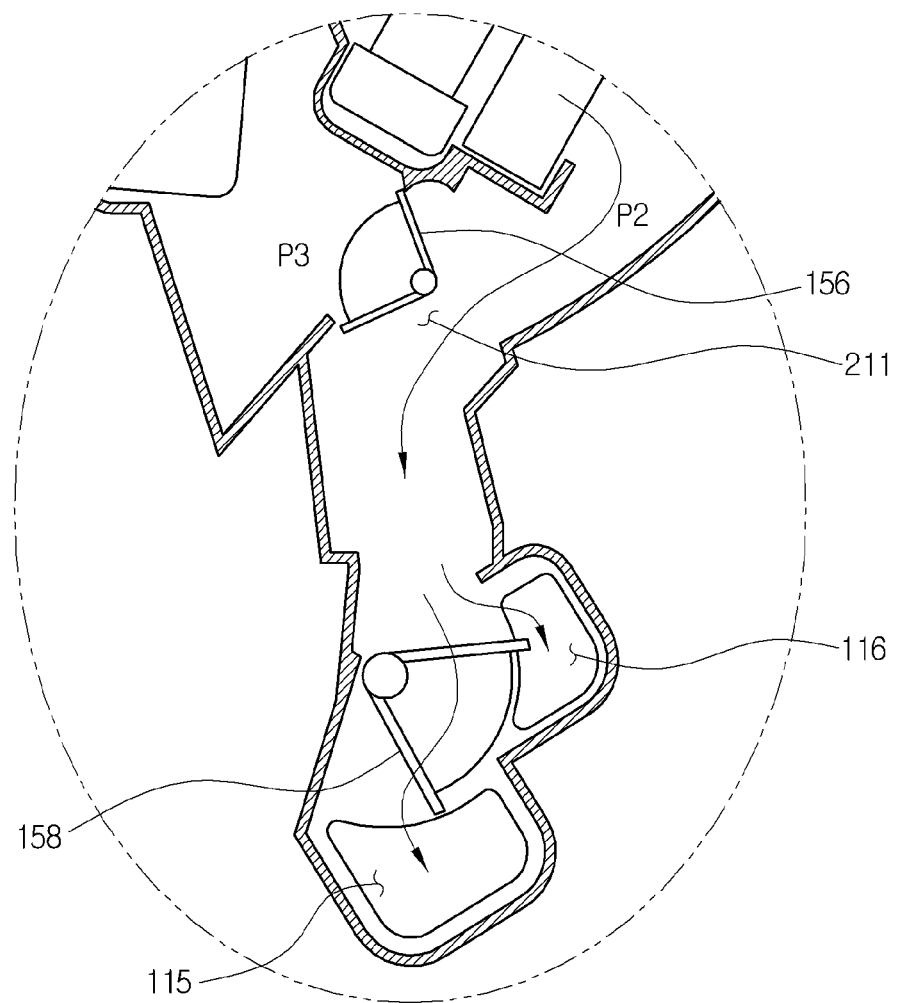
FIGS. 7 to 9 are sectional views illustrating modifications of FIG. 6.
Figure 8:
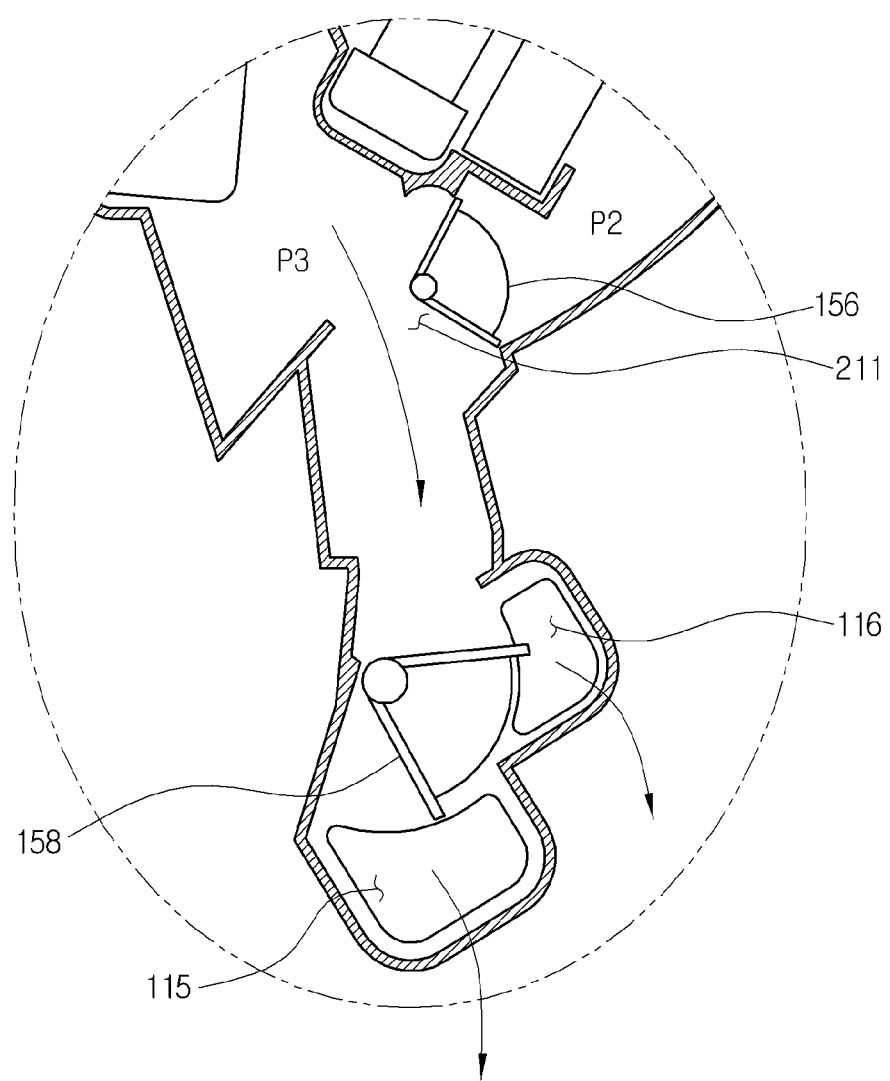
Figure 9:
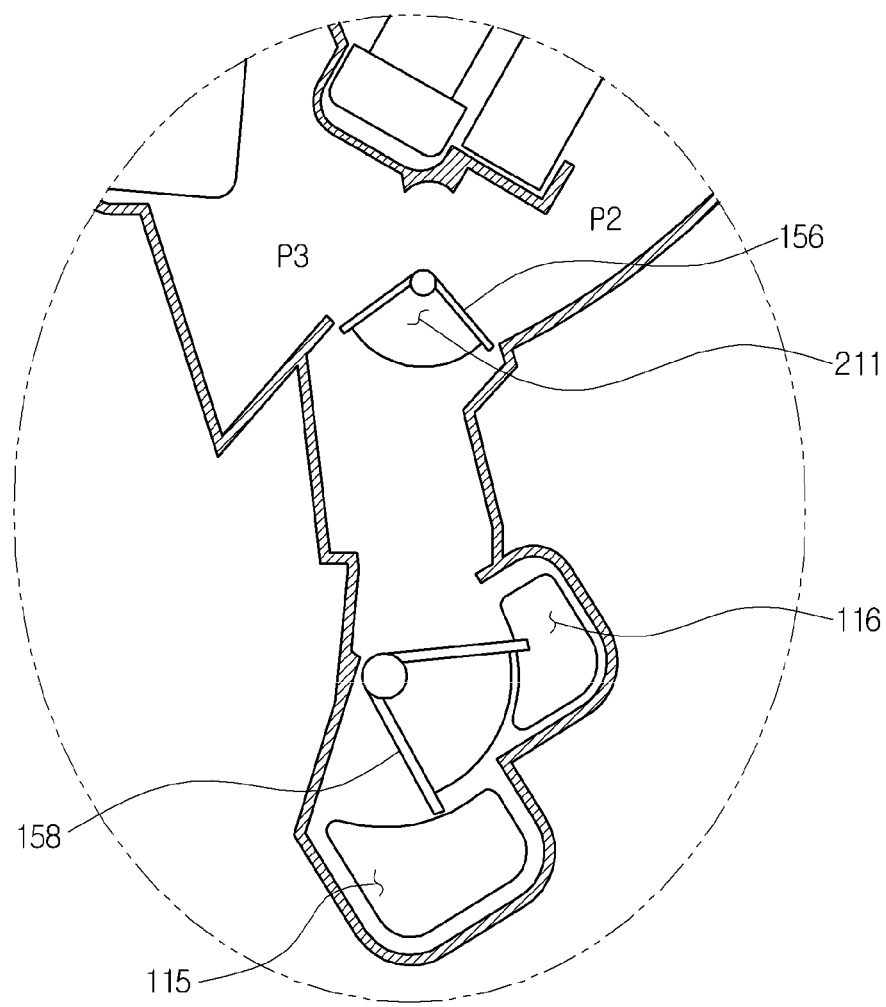

Meanwhile, referring to FIGS. 7 to 9, the second rear seat temperature door 156 is arranged at the joining part 211 between the downstream side of the hot air passage P2 and the rear seat cold air passage P3, and is formed in a dome shape. The second rear seat temperature door 156 adjusts the degree of opening among the hot air passage P2, the rear seat cold air passage P3, and the passage heading the rear seat air outlet. The second rear seat temperature door 156 performs a rear seat temperature adjusting function and a rear seat on-off function. That is, according to a modification of the present invention, the rear seat on-off door may be omitted, and the one dome-shaped second rear seat temperature door 156 can perform the rear seat temperature adjusting function and the rear seat on-off function. Through the above configuration, the air conditioner for a vehicle according to the present invention can reduce manufacturing costs by reducing the number of doors, and can reduce not only the width of the air conditioner in the back-and-forth direction of the vehicle but also the width of the air conditioner in the vertical direction.

In the meantime, referring to FIGS. 2 and 5, the rear seat air outlet is parallel with the heating heat exchanger, and is located inside a parallel extension line (L) which gets in contact with the air conditioning case. The parallel extension line (L) is parallel with the heater core 130, and gets in contact with the front surface of the air conditioning case 110. In FIGS. 2 and 5, it is illustrated that the rear seat air outlet is not located perfectly inside the parallel extension line (L), but preferably, the rear seat air outlet is located perfectly inside the parallel extension line (L) to further reduce the width of the air conditioner in the back-and-forth direction of the vehicle to be advantageous in securing a package.

Figure 10:
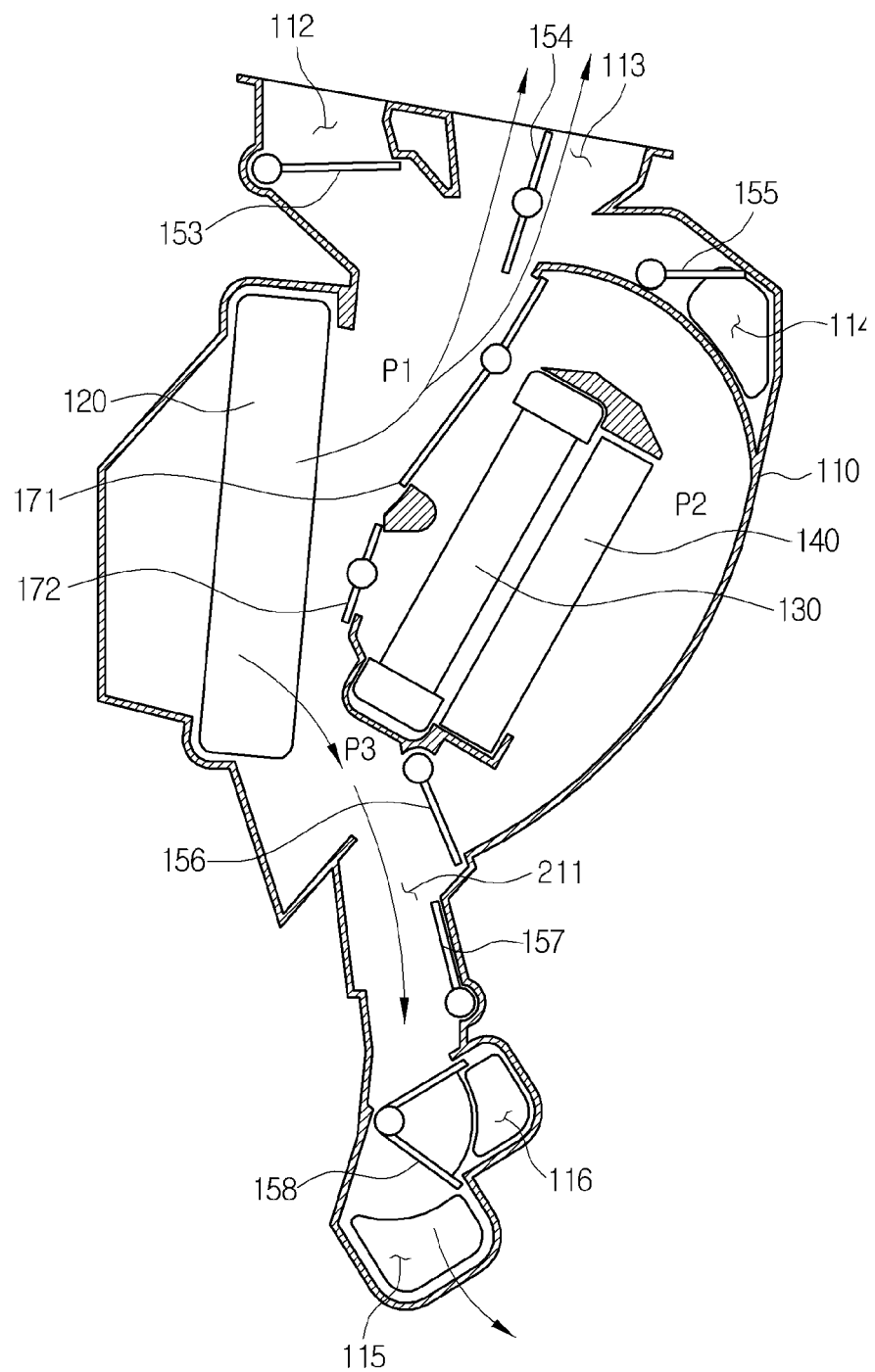
FIG. 10 is a view illustrating a vent mode of the air conditioner for a vehicle according to the second preferred embodiment of the present invention.

Referring to FIG. 10, in a vent mode, the front seat temperature door 171 and the first rear seat temperature door 172 close the hot air passage P2. Some of the air passing the evaporator 120 is discharged to the interior through the front seat face vent 113, and the remaining air is discharged to the interior through the rear seat face vent 115. In this instance, the second rear seat temperature door 156 closes the hot air passage P2, the rear seat on-off door 157 opens the passage heading the rear seat air outlet, and the rear seat mode door 158 closes the rear seat floor vent 116.

Figure 11:
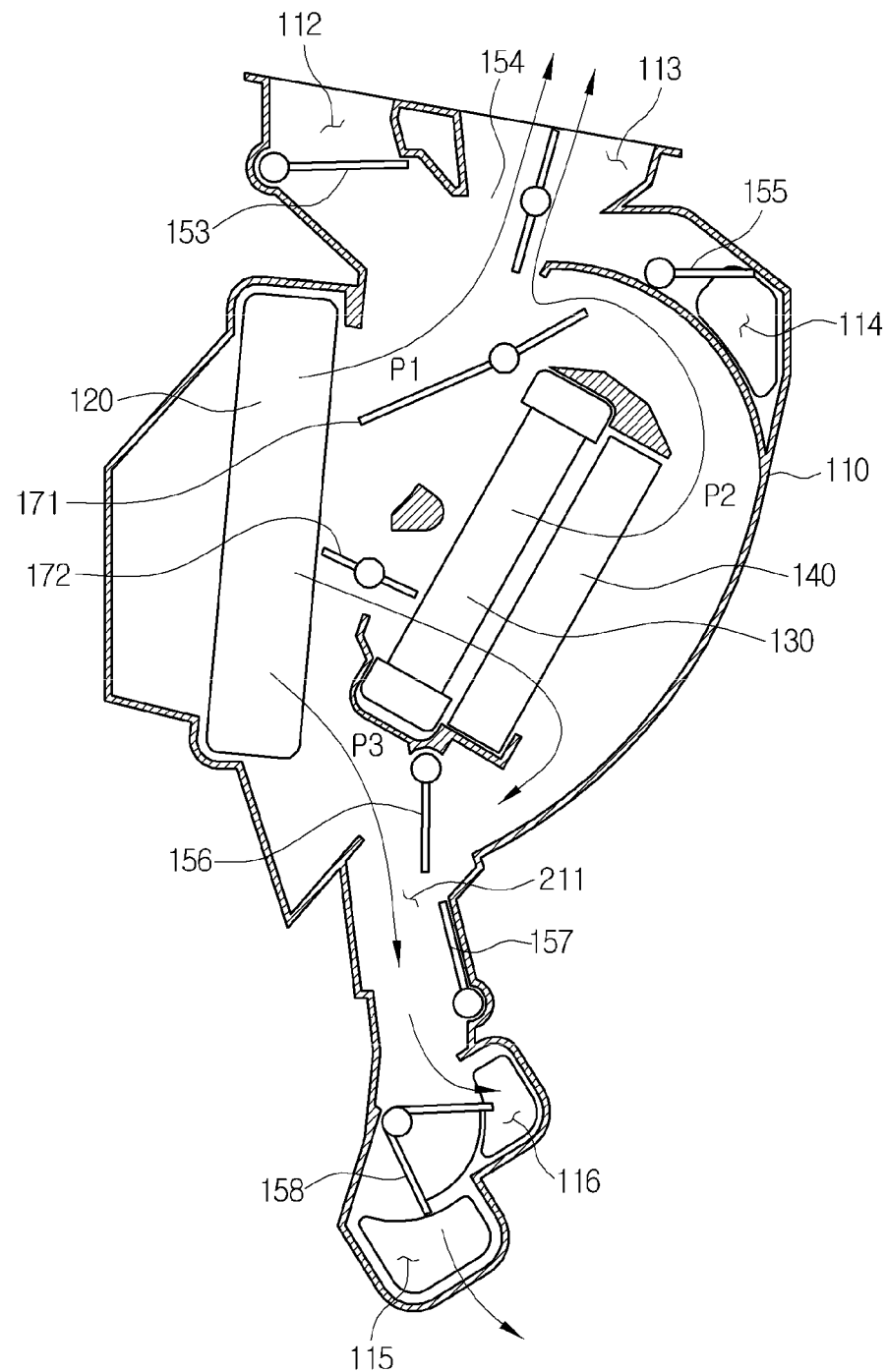
FIG. 11 is a view illustrating a bi-level mode of the air conditioner for a vehicle according to the second preferred embodiment of the present invention.

Referring to FIG. 11, in a bi-level mode, the front seat temperature door 171 and the first rear seat temperature door 172 open the front seat cold air passage P1, the hot air passage P2, and the rear seat cold air passage P3. Some of the air passing the evaporator 120 passes the heater core 130 and the electric heater 140, and the remaining air flows to the front seat cold air passage P1 and the rear seat cold air passage P3. Some of the air is discharged to the interior through the front seat face vent 113, and the remaining air is discharged to the interior through the rear seat floor vent 116 and the rear seat face vent 115. In this instance, the second rear seat temperature door 156 opens the hot air passage P2, the rear seat on-off door 157 opens the passage heading the rear seat air outlet, and the rear seat mode door 158 opens the rear seat floor vent 116 and the rear seat face vent 115.

Figure 12:
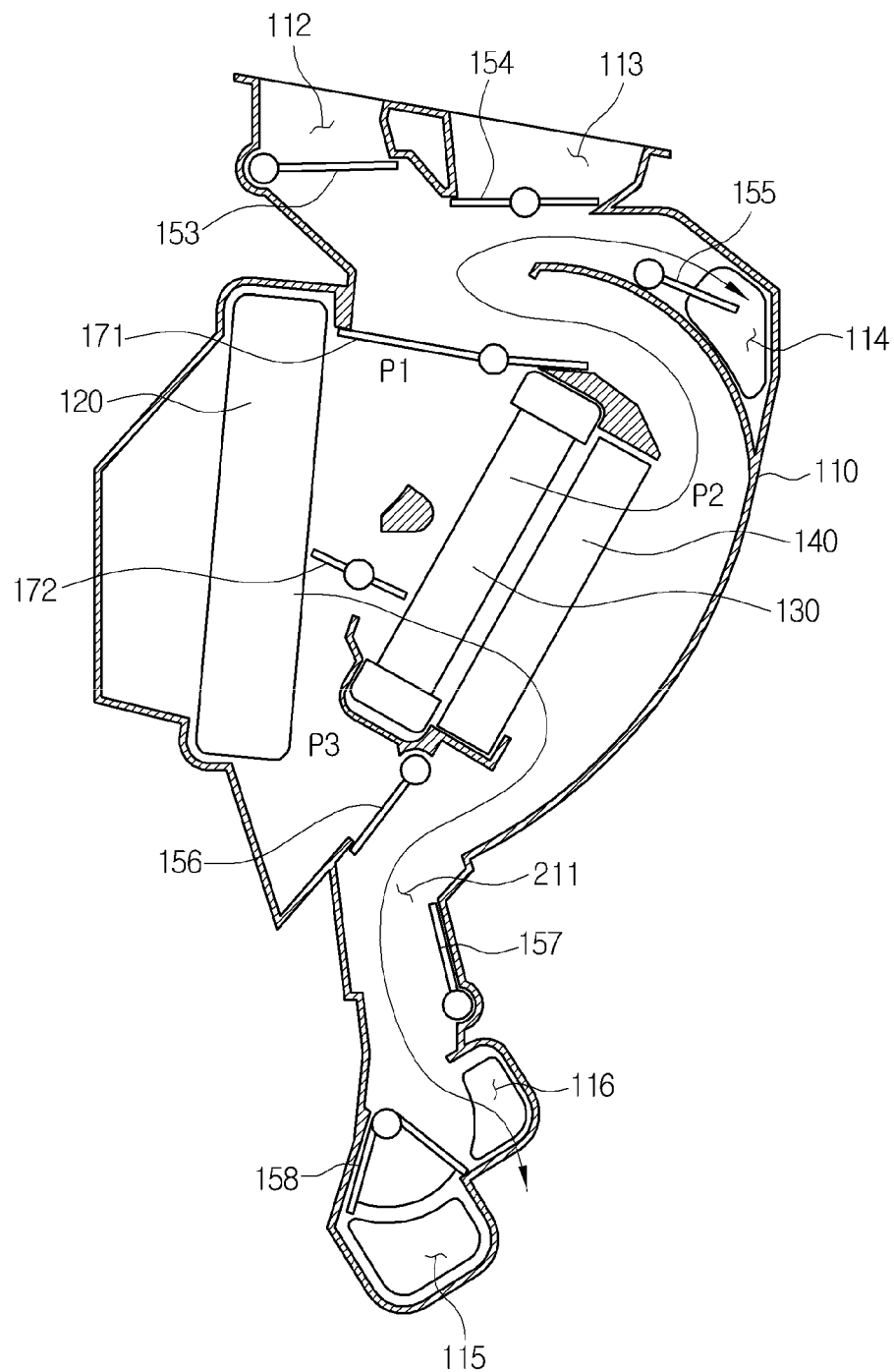
FIG. 12 is a view illustrating a floor mode of the air conditioner for a vehicle according to the second preferred embodiment of the present invention.

Referring to FIG. 12, in a floor mode, the front seat temperature door 171 and the first rear seat temperature door 172 close the front seat cold air passage P1 and open the hot air passage P2. The air passing the evaporator 120 passes the heater core 130 and the electric heater 140, and then, some of the air is discharged to the interior through the front seat floor vent 114 and the remaining air is discharged to the interior through the rear seat floor vent 116. In this instance, the second rear seat temperature door 156 opens the hot air passage P2, the rear seat on-off door 157 opens the passage heading the rear seat air outlet, and the rear seat mode door 158 closes the rear seat face vent 115.

Figure 13:
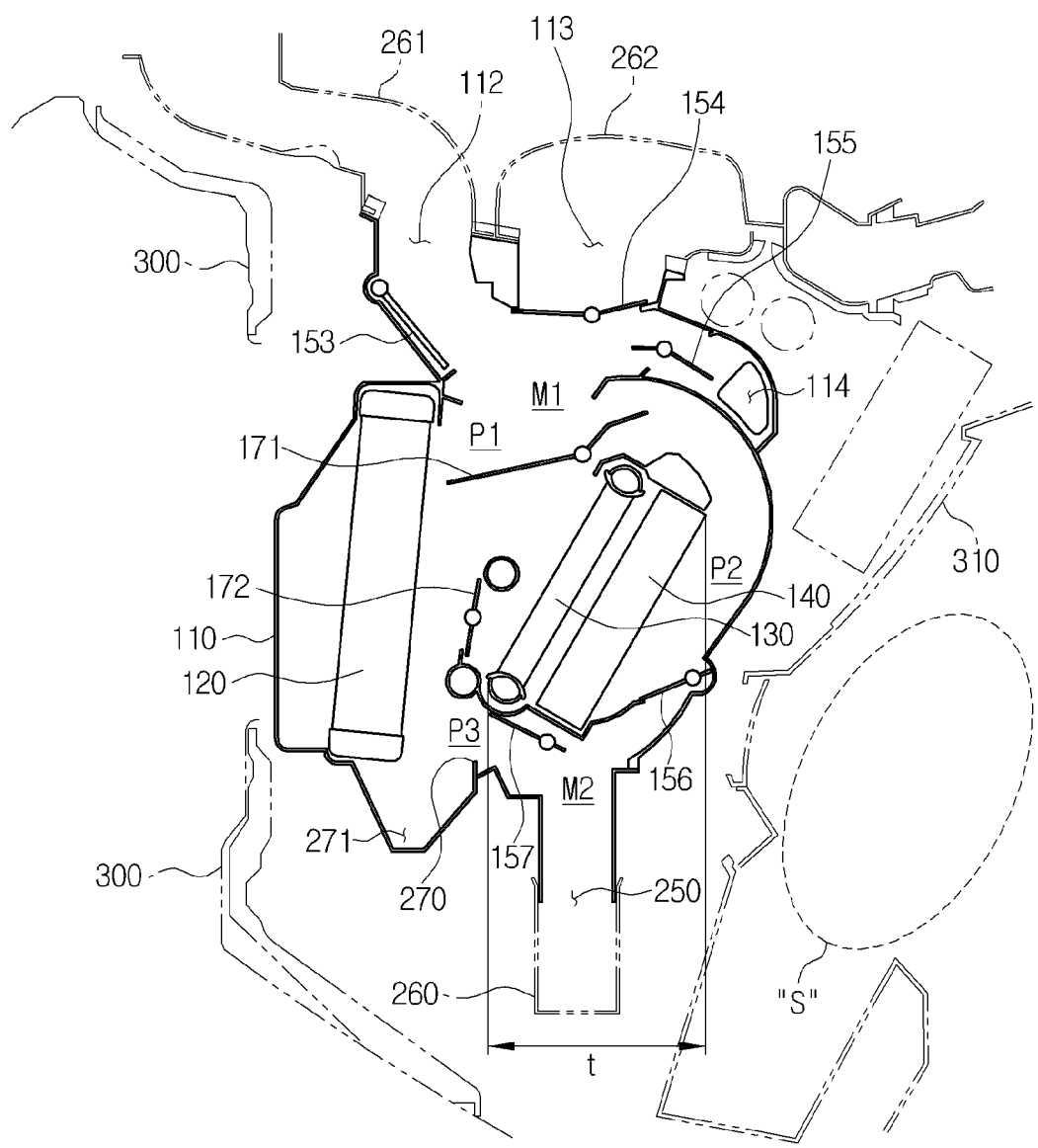
FIG. 13 is a sectional view illustrating an air conditioner for a vehicle according to a third preferred embodiment of the present invention.
Figure 14:
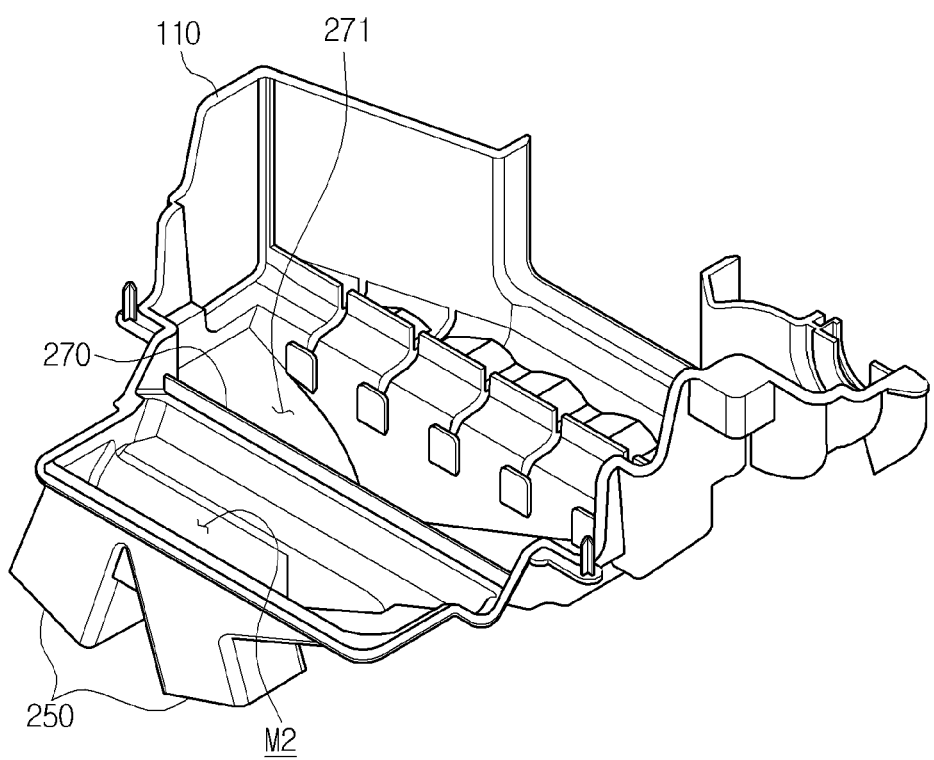
FIG. 14 is a perspective view illustrating a lower part of an air conditioning case according to the third preferred embodiment of the present invention.

Meanwhile, referring to FIGS. 13 and 14, an air conditioner for a vehicle according to a third preferred embodiment of the present invention includes an air conditioning case 110 having an air passage formed therein, and a cooling heat exchanger and a heating heat exchanger which are disposed in the air passage of the air conditioning case 110 to exchange heat with air passing through the air passage, wherein the cooling heat exchanger has an evaporator 120, and the heating heat exchanger has a heater core 130 and an electric heater 140. Air outlets include a front seat air outlet having a defrost vent 112, a front seat face vent 113, and a front seat floor vent 114, and a rear seat air outlet 250 for discharge air to the rear seat of the vehicle.

Inside the air conditioning case 110, disclosed are a defrost door 153 adjusting the degree of opening of the defrost vent 112, a vent door 154 adjusting the degree of opening of the front seat face vent 113, and a floor door 155 adjusting the degree of opening of the front seat floor vent 114. The air passage inside the air conditioning case 110 includes a front seat cold air passage P1, a hot air passage P2, and a rear seat cold air passage P3. A front seat mixing part M1 where the air passing through the front seat cold air passage P1 and the air passing through the hot air passage P2 are joined together is formed above the heating heat exchanger, and a rear seat mixing part M2 where the par passing through the hot air passage P2 and the air passing through the rear seat cold air passage P3 are joined together are formed below the heating heat exchanger.

Moreover, the air conditioning case 110 includes: a front seat temperature door 171 which adjusts the degree of opening between the front seat cold air passage P1 and a part of the hot air passage P2; a first rear seat temperature door 172 which is arranged between the evaporator 120 and the heater core 130 to adjust the degree of opening between the rear seat cold air passage P3 and the hot air passage P2; a second rear seat temperature door 156 which is arranged downstream of the heater core 130 to adjust the degree of opening between the rear seat cold air passage P3 and the hot air passage P2; and a rear seat on-off door 157 which adjusts the degree of opening of the rear seat cold air passage P3.

The air conditioner for a vehicle according to the third preferred embodiment of the present invention is installed between a dash pad 300 and a crash pad 310. At an upper portion of the air conditioning case 110, disclosed are and includes a defrost duct 261 connected with the defrost vent 112 and a vent duct 262 connected with the front seat face vent 113. The rear seat air outlet 250 is arranged at a place extending downwards from the air conditioning case 110. Moreover, the rear seat air outlet 250 is located just below the rear seat mixing part M2. That is, the rear seat air outlet 250 is arranged on the same straight line as the rear seat mixing part M2.

Additionally, a rear seat air discharge duct 260 is disposed below the rear seat air outlet 250, and the rear seat air discharge duct 260 extends downwards to be formed on the floor of the vehicle. Through the configuration, the air conditioner for a vehicle according to the present invention can be effectively installed in a vehicle having the concept of removing the console from the vehicle, such as an autonomous vehicle. In this instance, the rear seat air outlet 250 may be formed to blow air conditioning air toward a passenger's face, and a door is disposed at the discharge duct to adjust a volume of air conditioning air discharged to the interior of the vehicle.

Meanwhile, the heating heat exchanger is arranged to be inclined. That is, the heater core 130 and the electric heater 140 are mounted in the air conditioning case 110 while being inclined at a predetermined angle relative to a vertical line. Moreover, the rear seat air outlet 250, the second rear seat temperature door 156, and the rear seat on-off door 157 are arranged within a width (t) of the heating heat exchanger (the heater core and the electric heater) in the back-and-forth direction of the vehicle. Through the above configuration, the air conditioner for a vehicle according to the present invention can prevent reduction of the air volume by minimizing resistance of the air passing the heater core 130 and the electric heater 140, and reduce the width of the air conditioner in the back-and-forth direction of the vehicle, thereby further widening the space (S) below the driver's seat.

In addition, a counterflow prevention rib 270 is formed in the air conditioning case 110. The counterflow prevention rib 270 prevents water containing condensate water in the air conditioning case 110 from being discharged to the rear seat air outlet 250. That is, the counterflow prevention rib 270 protrudes upward from the floor surface of the air conditioning case 110, extends in the width direction of the vehicle, and is formed between the evaporator 120 and the rear seat mixing part M2. Preferably, the counterflow prevention rib 270 is formed at the upper end portion of a drain part 271 in which condensate water of the evaporator 120 gathers together.

Therefore, when a rear seat passage facing the rear seat air outlet 250 is formed just below the heating heat exchanger, it precludes the possibility that condensate water is introduced into the interior of the vehicle through the rear seat air outlet 250.

The invention claimed is:

1. An air conditioner for a vehicle, which includes an air conditioning case having an air passage formed therein and a plurality of air outlets, and a cooling heat exchanger and a heating heat exchanger which are disposed in the air passage of the air conditioning case to exchange heat with air passing through the air passage,
   wherein the air outlets comprise a front seat air outlet and a rear seat air outlet, and the rear seat air outlet is arranged below the heating heat exchanger in the direction of gravity.

2. The air conditioner according to claim 1, wherein the rear seat air outlet is disposed under the air conditioning case extending in a vertical direction from the heating heat exchanger.

3. The air conditioner according to claim 1, wherein the air passage of the air conditioning case comprises a hot air passage formed such that the air passing through the cooling heat exchanger passes through the heating heat exchanger, a front seat cold air passage formed such that the air passing through the cooling heat exchanger bypasses the heating heat exchanger to be discharged to the front seat of the vehicle, and a rear seat cold air passage formed such that the air passing through the cooling heat exchanger bypasses the heating heat exchanger to be discharged to the rear seat of the vehicle, and
   wherein the front seat cold air passage, the hot air passage, and the rear seat cold air passage are formed sequentially from top to bottom.

4. The air conditioner according to claim 3, comprising:
   a front seat temperature door which adjusts the degree of opening between the front seat cold air passage and the hot air passage;
   a first rear seat temperature door which is arranged between the cooling heat exchanger and the heating heat exchanger to adjust the degree of opening between the rear seat cold air passage and the hot air passage;
   a second rear seat temperature door which is arranged downstream of the heating heat exchanger to adjust the degree of opening between the rear seat cold air passage and the hot air passage; and
   a rear seat on-off door which adjusts the degree of opening of the rear seat cold air passage.

5. The air conditioner according to claim 4, wherein the rear seat air outlet, the second rear seat temperature door, and the rear seat on-off door are arranged within a width of the heating heat exchanger in the back-and-forth direction of the vehicle.

6. The air conditioner according to claim 4, wherein the rear seat air outlet, the second rear seat temperature door, and the rear seat on-off door are arranged on the outer face of the vehicle based on a dashboard.

7. The air conditioner according to claim 4, wherein the rear seat on-off door is arranged downstream of the rear seat mixing part.

8. The air conditioner according to claim 4, wherein the second rear seat temperature door and the rear seat on-off door are arranged below the heating heat exchanger in the direction of gravity, and
wherein the second rear seat temperature door, the rear seat on-off door, and the rear seat air outlet are arranged sequentially in a straight line in the direction of gravity.

9. The air conditioner according to claim 4, wherein the rear seat mixing part where the air passing through the hot air passage and the air passing through the rear seat cold air passage are joined together is formed below the heating heat exchanger, and
wherein the rear seat air outlet is formed below the rear seat mixing part.

10. The air conditioner according to claim 9, wherein a rear seat air discharge duct is disposed below the rear seat air outlet, and
wherein the rear seat air discharge duct extends downward to be formed on the floor of the vehicle.

11. The air conditioner according to claim 1, wherein a front seat mixing part and a rear seat mixing part are arranged vertically side by side in the direction of gravity.

12. The air conditioner according to claim 1, wherein the rear seat air outlet is parallel with the heating heat exchanger and is located inside a parallel extension line getting in contact with the air conditioning case.

13. The air conditioner according to claim 1, wherein the heating heat exchanger is arranged to be inclined.

14. The air conditioner according to claim 1, wherein a counterflow prevention rib is formed in the air conditioning case to prevent water containing condensate water from being discharged to the rear seat air outlet.

15. The air conditioner according to claim 14, wherein the counterflow prevention rib protrudes upward from the floor surface of the air conditioning case, and is formed between the cooling heat exchanger and the rear seat mixing part.

16. An air conditioner for a vehicle, which includes an air conditioning case having an air passage formed therein and a plurality of air outlets, and a cooling heat exchanger and a heating heat exchanger which are disposed in the air passage of the air conditioning case to exchange heat with air passing through the air passage,
wherein the air outlets comprise a front seat air outlet and a rear seat air outlet, and the rear seat air outlet is arranged below the front seat air outlet in the direction of gravity.

* * * * *